UNITED STATES PATENT OFFICE.

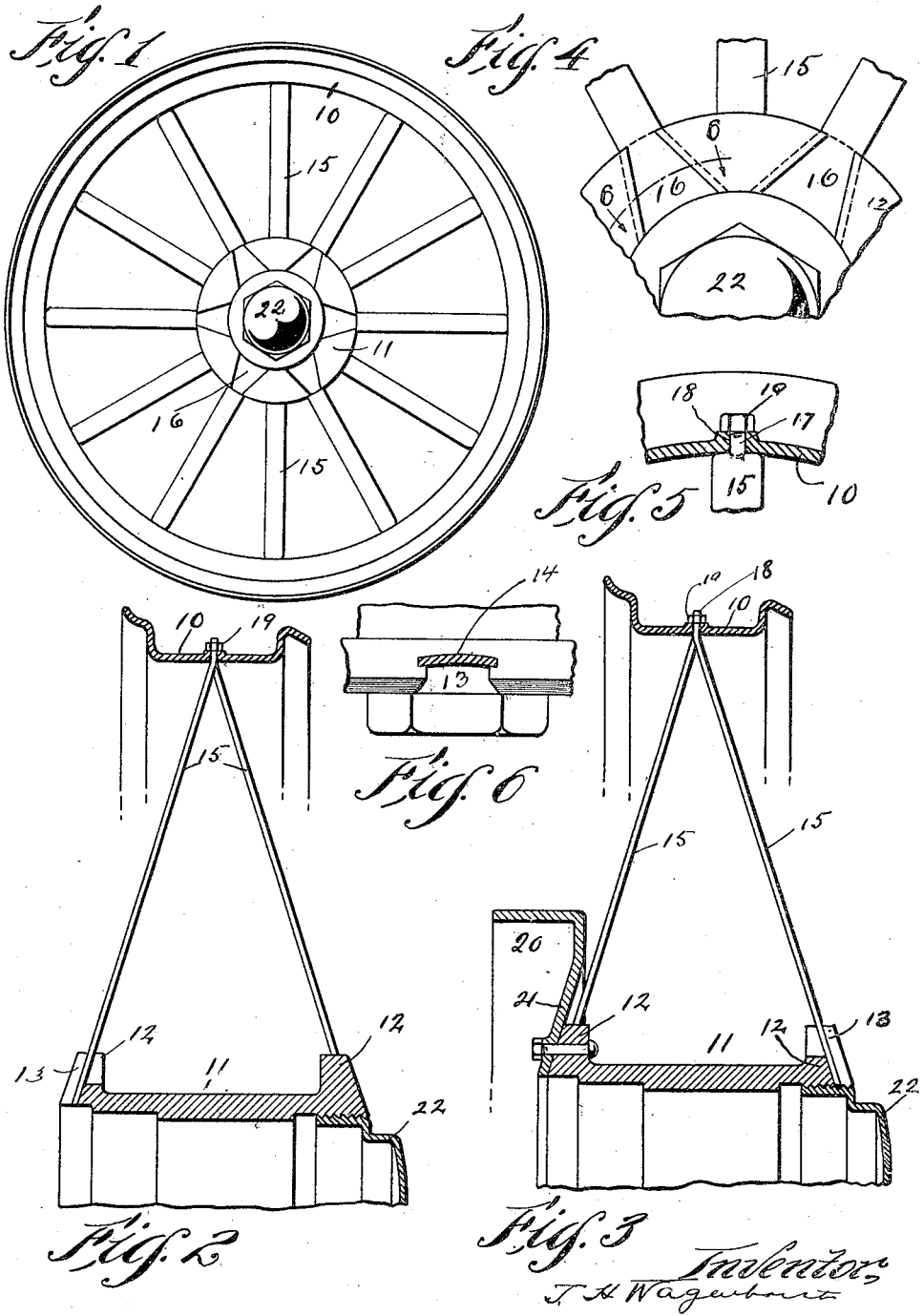

JAMES H. WAGENHORST, OF JACKSON, MICHIGAN.

METAL WHEEL.

1,423,373. Specification of Letters Patent. Patented July 18, 1922.

Application filed August 20, 1919. Serial No. 318,812.

*To all whom it may concern:*

Be it known that I, JAMES H. WAGENHORST, a citizen of the United States, at present residing at Jackson, in the county of Jackson and State of Michigan, have invented certain new and useful Improvements in Metal Wheels, of which the following is a specification.

This invention relates generally to metal wheels and more particularly to one embodying a sheet metal felly, sheet metal spokes and a hub to which the inner ends of the spokes are connected, the outer ends being secured to the sheet metal felly and placed under tension. The object of the invention is to provide a simple and secure method of connecting the inner ends of the spokes to the hub and another object of the invention is to provide a spoke which can be quickly and easily fabricated in large quantities.

With these and certain other objects in view, the invention consists in the novel features of construction and combination all of which will be fully described hereinafter and set forth in the appended claims.

In the drawings forming a part of this specification, Fig. 1 is a side elevation of a wheel constructed in accordance with my invention; Fig. 2 is a vertical sectional view of one half of a wheel; Fig. 3 is a similar view showing the brake drum attached to the hub; Fig. 4 is an enlarged detail view illustrating the manner of connecting the inner ends of the spokes to the hub; Fig. 5 is a detail view showing the manner of connecting the outer ends of the spokes to the felly and Fig. 6 is a detail sectional view on the line 6, 6 of Fig. 4.

In carrying out my invention I employ a sheet metal felly 10 which may be of any desired cross sectional shape. In practice, however, this sheet metal felly is usually made to receive a tire carrying rim and consequently would embody a base portion and rim receiving flanges, preferably of different heights, although, as before stated, the exact cross sectional shape of the rim is immaterial. The hub 11 is of the usual construction so far as its interior is concerned but upon the exterior at each end there is provided a radial flange 12, the outer faces of which are inclined as shown, the angle of inclination being determined by the length of the hub. Each radial flange has undercut tapering recesses 13 cut in the outer or inclined face thereof and by reference to Fig. 6 it will be noticed that the back wall of said recess 14 is curved slightly, the purpose of which will appear hereinafter. The spokes 15 are of sheet metal and have their inner ends 16 enlarged, as shown, to snugly fit into the undercut recess 13 in the hub flange and the extreme outer end of the spoke is rounded as shown at 17 and projected through the opening 18 in the felly, the extreme end of said spoke being threaded to receive the fastening nut 19. The base of the felly is forced outwardly when an aperture is produced and the spoke is formed with a fillet at the juncture of the spoke proper and rounded end so that a rigid joint can be effected between the spoke and felly when the parts are properly tightened.

In making up the wheel, the spokes are passed outwardly through the tapering recesses in the hub flanges until the enlarged ends thereof fit snugly into said recesses and by having the rear wall of the recess curved, the natural tendency of the metal, when subjected to the wedging strain within the recess, will accommodate itself to the shape of said recess and thereby provide a perfectly tight fit within said recess. By means of this construction, the use of bolts and rivets or other fastening means are completely eliminated so far as the fastening of the spoke ends to the hub are concerned. The spokes can be arranged in alternate order at the opposite ends of the hub, or any other suitable arrangement may be employed. By means of the nuts upon the threaded ends of the spokes, said spokes can be subjected to the proper tension and in case one spoke should become broken or damaged, it can be quickly and easily removed and another one inserted without disturbing the other spokes of the assembly. The brake drum 20 can be bolted to the hub flanges, the central portion of said drum being pressed inwardly as shown at 21 to accommodate the angle of the hub flange. The hub cap 22 will close the inner ends of the recesses in the hub flanges at the outer end. The strip spokes can be rolled off in continuous lengths in opposed relation and then separated into separate spokes thereby greatly reducing the cost of manufacture. It will thus be seen that I provide a sheet metal wheel of the suspension type which can be quickly and easily made and which will eliminate a large number of expensive operations and also do away with fastening means between the hub and the spoke ends.

Having thus described my invention, what I claim is:—

1. A wheel comprising a hub, a sheet metal felly and sheet metal spokes connecting said felly and hub, the inner ends of said spokes being enlarged, the hub having flanges at its opposite ends provided with recesses adapted to receive the enlarged spoke end radially therein.

2. A wheel comprising a hub, a sheet metal felly and sheet metal spokes, the inner ends of which are enlarged, said hub having radial flanges at its opposite ends, said flanges having outwardly tapering recesses adapted to radially receive the enlarged ends of the spokes.

3. A wheel comprising a hub having radial flanges at its opposite ends, the outer faces of said flanges being provided with outwardly tapering recesses, a sheet metal felly and sheet metal spokes, the inner ends of said spokes being enlarged and adapted to fit radially into the tapering recesses of the hub flanges, the outer ends of said spokes being projected through openings in the felly, and means applied to the ends of said spokes for tensioning said spokes and drawing the enlarged inner end thereof into the tapered recess in the hub flange.

4. A wheel comprising a hub having flanges at its opposite ends provided with outwardly tapering undercut recesses, a sheet metal felly and sheet metal spokes, the inner ends of said spokes being enlarged and adapted to fit radially into the tapered and undercut recesses in the hub flanges.

JAMES H. WAGENHORST.